United States Patent [19]
Doerge et al.

[11] Patent Number: 5,539,006
[45] Date of Patent: Jul. 23, 1996

[54] RIGID FOAMS WITH IMPROVED INSULATION AND PHYSICAL PROPERTIES

[75] Inventors: Herman P. Doerge, Pittsburgh, Pa.; Edward E. Ball, Weirton; Steven L. Schilling, Glen Dale, both of W. Va.; Edward P. Squiller, Pittsburgh, Pa.

[73] Assignee: Bayer Corporation, Pittsburgh, Pa.

[21] Appl. No.: 167,371

[22] Filed: Dec. 15, 1993

[51] Int. Cl.$^6$ ............................................. C08J 9/06
[52] U.S. Cl. ............................... 521/98; 521/90; 521/131; 521/174; 521/909; 528/76
[58] Field of Search .................. 528/76; 521/90, 521/98, 131, 909, 914, 174

[56] References Cited

U.S. PATENT DOCUMENTS

| | | | |
|---|---|---|---|
| 3,085,085 | 4/1963 | Wismer et al. | 260/209 |
| 3,153,002 | 10/1964 | Wismer et al. | 260/2.5 |
| 3,215,652 | 11/1965 | Kaplan | 260/2.5 |
| 3,222,357 | 12/1965 | Wismer et al. | 260/209 |
| 4,430,490 | 2/1984 | Doerge | 528/77 |
| 4,900,365 | 2/1990 | Lund et al. | 134/12 |
| 5,205,956 | 4/1993 | Volkert et al. | 521/98 |

OTHER PUBLICATIONS

Dishart et al "The DuPont Program on Fluorocarbon Alternative Blowing Agents for Polyurethane Foams", Polyurethanes World Congress 1987, pp. 59–66.

*Primary Examiner*—James J. Seidleck
*Assistant Examiner*—Duc Truong
*Attorney, Agent, or Firm*—Joseph C. Gil; Lyndanne M. Whalen

[57] ABSTRACT

Rigid polyurethane foams are produced by reacting an organic polyisocyanate with a sucrose-based polyether polyol in the presence of a catalyst and a blowing agent selected from hydrogen-containing chlorofluorocarbons, hydrogen-containing fluorocarbons, hydrocarbons and mixtures thereof. These foams are characterized by good demold and insulation properties.

24 Claims, No Drawings

5,539,006

RIGID FOAMS WITH IMPROVED INSULATION AND PHYSICAL PROPERTIES

BACKGROUND OF THE INVENTION

The present invention relates to a process for the production of rigid polyurethane foams having improved demold and outstanding insulation properties.

Processes for the production of rigid polyurethane foams are known. Sucrose-based polyols are of particular interest as the primary isocyanate-reactive reactant because of their relatively low cost, high functionality and because they are relatively simple to produce. Processes for producing such sucrose-based polyols are disclosed, for example, in U.S. Pat. Nos. 3,085,085; 3,153,002; 3,222,357; and 4,430,490. Each of these patents teaches that the disclosed polyols are useful in the production of polyurethane foams.

At the present time, a major concern of foam producers, particularly rigid foam producers, is the development of rigid foam systems in which the chlorofluorocarbon blowing agent is replaced with a more environmentally acceptable blowing agent. HCFCs (i.e., hydrogen containing chlorofluorocarbons), HFCs (hydrogen containing fluorocarbons), and hydrocarbons such as n-pentane cyclopentane, isopentane and blends of these blowing agents are presently considered to be possible alternatives.

U.S. Pat. No. 4,900,365, for example, teaches that a mixture of trichlorofluoromethane, a dichlorofluoroethane selected from a specified group and isopentane is useful as a blowing agent for the preparation of polyurethane foams. Dishart et al's paper entitled "The DuPont Program on Fluorocarbon Alternative Blowing Agents for Polyurethane Foams", Polyurethanes World Congress 1987, pages 59–66 discusses the investigation of various HCFCs as possible blowing agents for rigid polyurethane foams. Neither of these disclosures, however, teaches a process for the production of rigid polyurethane foams having good physical properties from sucrose-based polyols with only an HCFC, an HFC or hydrocarbon blowing agent. In fact, Dishart et al teaches that conventional sucrose-based polyols produced foams which became soft, shrank and in some cases collapsed when HCFC-123 was used as the blowing agent.

A process in which a sucrose-based polyol was used in combination with an HCFC, an HFC or a hydrocarbon blowing agent to produce a rigid polyurethane foam having good physical properties, particularly good demold and insulating properties would, therefore, be advantageous.

SUMMARY OF THE INVENTION

It is an object of the present invention to provide a process for the production of rigid polyurethane foams having good demold and insulation properties in which an HCFC, HFC or hydrocarbon is used as the primary blowing agent.

It is also an object of the present invention to provide a process for the production of rigid polyurethane foams having good physical properties in which the polyol employed is a sucrose-based polyol.

It is a further object of the present invention to provide a process for the production of rigid polyurethane foams which are useful in the production of refrigeration units.

It is another object of the present invention to provide rigid polyurethane foams characterized by outstanding demold properties and excellent K-factors.

These and other objects which will be apparent to those skilled in the art are accomplished by reacting an organic polyisocyanate with a sucrose-based, ethylene oxide, propylene oxide polyether polyol having an average molecular weight of from about 400 to about 1200 in the presence of a blowing agent selected from hydrogen-containing chlorofluorocarbons hydrogen-containing fluorocarbons, hydrocarbons and mixtures thereof and a catalyst.

DETAILED DESCRIPTION OF THE PREFERRED EMBODIMENTS OF THE PRESENT INVENTION

The present invention is directed to a process for the production of rigid polyurethane foams having excellent demold and insulation properties and to the foams produced by this process. In the process of the present invention, an organic isocyanate is reacted with a sucrose-based polyether polyol having an average molecular weight of from about 400 to about 1200, an ethylene oxide content of from about 6 to about 38% by weight, preferably from about 12 to about 28% by weight and a propylene oxide content of from about 29 to about 68% by weight, preferably from about 36 to about 55% by weight based on the total polyol weight, in the presence of a blowing agent selected from hydrogen-containing chlorofluorocarbons, hydrogen-containing fluorocarbons, hydrocarbons and mixtures thereof and a catalyst at an isocyanate index of from about 0.9 to about 3.1, preferably from about 1.05 to about 1.55. The product foams generally have K-factors of less than 0.13 Btu-in./hr.ft$^2$°F.

Any of the known organic isocyanates may be used in the process of the present invention. Suitable isocyanates include aromatic, aliphatic, and cycloaliphatic polyisocyanates and combinations thereof. Examples of useful isocyanates are: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methyl-phenyl-2,4-phenyl diisocyanate, 4,4'-diphenylmethane diisocyanate, 2,4'-diphenyl-methane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenyl-methane-2,2', 5,5'-tetraisocyanate and the polymethylene polyphenylpolyisocyanates.

Undistilled or a crude polyisocyanate may also be used in making polyurethanes by the process of the present invention. The crude toluene diisocyanate obtained by phosgenating a mixture of toluene diamines and the crude diphenylmethane diisocyanate obtained by phosgenating crude diphenylmethanediamine are examples of suitable crude polyisocyanates. Suitable undistilled or crude polyisocyanates are disclosed in U.S. Pat. No. 3,215,652.

Preferred polyisocyanates for the production of rigid polyurethanes are methylene-bridged polyphenyl polyisocyanates and prepolymers of methylene-bridged polyphenyl polyisocyanates having an average functionality of from about 1.8 to about 3.5 (preferably from about 2.0 to about 3.1) isocyanate moieties per molecule and an NCO content of from about 28 to about 34% by weight, due to their ability to cross-link the polyurethane.

The polyisocyanate is generally used in an amount such that the isocyanate index (i.e., the ratio of equivalents of isocyanate groups to equivalents of isocyanate-reactive groups) is from about 0.9 to about 3.0, preferably from about 1.0 to about 1.5.

The polyols employed in the process of the present invention are polyether polyols prepared by reacting sucrose and optionally other initiators (with or without water) with both ethylene oxide and propylene oxide in the presence of an alkaline catalyst. The product is then treated with an acid, preferably a hydroxy-carboxylic acid so as to neutralize the alkaline catalyst. U.S. Pat. No. 4,430,490 which discloses a suitable process is incorporated herein by reference.

It is preferred that the sucrose first be reacted with ethylene oxide and then propylene oxide. The ethylene oxide is generally used in an amount of from about 10 to about 50%, preferably from about 20 to about 40% by weight of the total alkylene oxide used. The propylene oxide is generally used in an amount of from about 50 to about 90% by weight of the total alkylene oxide employed, preferably from about 60 to about 80% by weight. The total amount of alkylene oxide used is selected so that the product polyol will have an average molecular weight of from about 400 to about 1200, preferably from about 550 to about 750.

The acid used to neutralize the alkaline catalyst present in the polyether polyol may be any acid which will result in an acidified polyether polyol having a pH of from about 4.0 to about 8.0, preferably from 5.5 to 7.5. Hydroxycarboxylic acids are the preferred neutralizing acids.

Examples of useful hydroxycarboxylic acids include: lactic acid, salicylic acid, substituted salicylic acid such as 2-hydroxy 3-methyl benzoic acid, 2-hydroxy 4-methyl benzoic acid and mixtures of such acids. Lactic acid is most preferred.

The sucrose-based polyether polyol is included in the foam-forming mixture in an amount of from about 5 to about 35% by weight, based on the total foam-forming mixture, preferably from about 20 to about 30% by weight.

Other polyether polyols (i.e., polyether polyols which are not based on sucrose) known to be useful in the production of rigid polyurethane foams may, optionally, be used in combination with the required sucrose-based polyether polyol. When used, these optional polyols are present in an amount which is no greater than 60%, preferably from about 20 to about 50% of the total amount of polyol.

The blowing agent employed in the process of the present invention may be any one of the known hydrogen-containing chlorofluorocarbons or hydrogen containing fluorocarbons. Specific examples of such blowing agents include: 1,1-dichloro-2,2,2-trifluoroethane (HCFC-123), 1,1-dichloro-1-fluoroethane (HCFC-141b), 1,1,1,4,4,4-hexafluorobutane (HFC-356), and 1,1,1,2-tetrafluoroethane (HFC-134a). HCFC-141b and HFC-356 are particularly preferred. Hydrocarbons which are known to function as blowing agents in rigid foam systems may also be used in the practice of the present invention. Examples of such hydrocarbons include: n-pentane, cyclopentane, and isopentane. Mixtures of the HCFC, HFC and hydrocarbon blowing agents may also be used. The blowing agent is generally included in the foam-forming mixture in an amount of from about 5 to about 20% by weight, based on the total foam formulation, preferably from about 8 to about 16% by weight.

Water may optionally be included in the reaction mixtures of the present invention. When used, the water is generally present in an amount of from about 0.1% to about 1.5%, based on the total foam formulation. Any of the catalysts known to be useful in the production of rigid polyurethane foams may be employed in the process of the present invention. Tertiary amine catalysts are particularly preferred. Specific examples of suitable catalysts include: pentamethyldiethylenetriamine, N-N-dimethylcyclohexylamine, N,N', N"-dimethylamino-propylhexahydrotriazine, and tetramethyl ethylenediamine. Pentamethyldiethylenetriamine and N,N',N"-dimethylamino-propylhexahydrotriazine are particularly preferred.

Materials which may optionally be included in the foam-forming mixtures of the present invention include: chain extenders, crosslinking agents, surfactants, pigments, colorants, fillers, antioxidants, flame retardants, and stabilizers. Carbon black is a preferred additive.

Having thus described our invention, the following examples are given as being illustrative thereof. All parts and percentages given in these examples are parts by weight and percentages by weight, unless otherwise indicated.

EXAMPLES

The materials used in the following examples were as follows:

POLYOL A: a polyether polyol formed by reacting sucrose, propylene glycol and water with propylene oxide in the presence of a base and subsequently neutralizing the reaction mixture with sulfuric acid and filtering off the salt. This polyol having more than 4 isocyanate reactive hydrogen atoms and an OH number of 470 is available from Miles Inc. under the name Multranol 4034.

POLYOL B: a polyether polyol prepared by reacting sucrose, propylene glycol and water first with ethylene oxide (30% of total alkylene oxide) and then with propylene oxide (70% of total alkylene oxide) in the presence of a base and subsequently neutralizing the reaction mixture with lactic acid. The salt formed was allowed to remain in the polyol. This polyol had an OH number of 467.2.

POLYOL C: a polyether polyol prepared by reacting sucrose, propylene glycol and water first with ethylene oxide (30%) and then with propylene oxide (70%) in the presence of a base and subsequently neutralizing the reaction mixture with lactic acid. This polyol had an OH number of 425.2.

POLYOL D: a high functionality polar aromatic polyester polyol derived from a dimethyl terephthalate co-product which is commercially available under the name Terate 552 from Cape Industries having a hydroxyl number of approximately 420.

POLYOL E: a tetrafunctional polyol prepared by reacting ethylene diamine with propylene oxide in the presence of a base and subsequently neutralizing with sulfuric acid and filtering off the salt which formed. This polyol has an OH number of 770 and is available from Miles Inc. under the name Multranol E-9181.

POLYOL F: a polyether polyol prepared by reacting sucrose, propylene glycol and water first with ethylene oxide (30% of total alkylene oxide) and then propylene oxide (70% of total alkylene oxide) in the presence of a base and subsequently neutralizing the reaction mixture with lactic acid. This polyol had an OH number of 459.8.

POLYOL G: a polyether polyol prepared by reacting ethanol amine with propylene oxide in the presence of a base and subsequently neutralizing the reaction mixture with sulfuric acid and filtering off the salt which formed. This polyol had an OH number of 350.

POLYOL H: a polyether polyol prepared by reacting sucrose, propylene glycol and water first with ethylene oxide (30% of total alkylene oxide) and then with propylene oxide (70% of total alkylene oxide) in the presence of a base and subsequently neutralizing the reaction mixture with lactic acid. This polyol had an OH number of 454.

POLYOL I: a polyether polyol prepared by reacting sucrose, propylene glycol and water first with ethylene oxide (30% of total alkylene oxide) and then with propylene oxide (70% of total alkylene oxide) in the presence of a base and subsequently neutralizing the reaction mixture with sulfuric acid and filtering off the salt which formed. This polyol had an OH number of 467.4.

POLYOL J: a polyether polyol prepared by reacting sucrose, propylene glycol and water first with ethylene oxide (30% of total alkylene oxide) and then with propylene oxide (70% of total alkylene oxide) in the presence of a base and subsequently neutralizing the reaction mixture with sulfuric acid and filtering off the salt which formed. This polyol had an OH number of 459.7.

POLYOL K: a polyether polyol prepared by reacting sucrose, propylene glycol and water first with ethylene oxide (30% of total alkylene oxide) and then with propylene oxide (70% of total alkylene oxide) in the presence of a base and subsequently neutralizing the reaction mixture with lactic acid. This polyol had an OH number of 480.8.

POLYOL L: a sucrose-initiated polyether polyol formed by reacting sucrose, propylene glycol and water with first ethylene oxide (30% of total alkylene oxide) and then propylene oxide (70% of total alkylene oxide) in the presence of a base and subsequently neutralizing the reaction mixture with lactic acid. This polyol had an OH number of 475.2.

POLYOL M: a tetrafunctional polyol prepared by reacting ethylene diamine with propylene oxide in the presence of a base and subsequently neutralizing the reaction mixture with sulfuric acid and filtering off the salt which formed. This polyol has a OH number of 630 and is available from Miles Inc. under the name Multranol 4050.

POLYISOCYANATE A (NCO A): a modified polymethylene polyphenyl polyisocyanate prepolymer which is commercially available under the name Mondur E-577 from Miles Inc having an isocyanate group content of approximately 29.5%.

POLYISOCYANATE B (NCO B): Mondur MR isocyanate, a polymethylene polyphenyl polyisocyanate which is commercially available from Miles, Inc having an isocyanate content of about 31%.

POLYISOCYANATE C (NCO C): Mondur MR isocyanate, a polymethylene polyphenyl polyisocyanate containing 12% by weight of carbon black having an isocyanate content of about 27%.

SURFACTANT A: a polyalkyleneoxide dimethyl siloxane copolymer which is commercially available from Union Carbide under the designation L-5440.

CATALYST A (CAT. A): a strongly basic, amber-brown liquid having a characteristic amine odor which is commercially available from Air Products and Chemicals, Inc. under the name Polycat 41.

CATALYST B (CAT. B): a tertiary amine catalyst which is commercially available from Air Products and Chemicals, Inc. under the name Polycat 8.

CATALYST C (CAT. C): a tertiary amine catalyst which is commercially available from Rhein Chemie under the name Desmorapid PV.

HCFC-123: 1,1-dichloro-2,2,2-trifluoroethane.

HCFC-141b: 1,1-dichloro-1-fluoroethane.

HFC-356: 1,1,1,4,4,4-hexafluorobutane.

Examples 1–11

Foams were prepared by reacting the components listed in Table 1 in the amounts indicated by mixing the polyols, catalysts, surfactant, water and blowing agents to form a master batch. The master batch was then mixed with the amount of polyisocyanate indicated in Table 1 and poured into a 25 inch×13 inch×2 inch metal mold. The minimum fill density was determined and panels were prepared at the % packing level reported in Table 2. The properties of those foams are reported in Table 2.

TABLE 1

| EXAMPLE | 1 | 2 | 3 | 4 | 5 | 6 | 7 | 8 | 9 | 10 | 11 |
|---|---|---|---|---|---|---|---|---|---|---|---|
| POLYOL | A | B | A | B | A | I | I | A | F | J | K |
| AMT. (pbw) | 33.4 | 33.4 | 33.4 | 33.4 | 33.4 | 33.4 | 33.4 | 33.3 | 33.4 | 33.4 | 33.3 |
| POLYOL | D | D | D | D | D | D | D | D | D | D | D |
| AMT. (pbw) | 26.7 | 26.7 | 26.7 | 26.7 | 26.7 | 26.7 | 26.7 | 26.6 | 26.7 | 26.7 | 26.6 |
| POLYOL | E | E | E | E | E | E | E | E | E | E | E |
| AMT. (pbw) | 6.68 | 6.68 | 6.68 | 6.68 | 6.68 | 6.68 | 6.68 | 6.65 | 6.68 | 6.68 | 6.66 |
| SURFACT. (pbw) | 1.90 | 1.90 | 1.90 | 1.90 | 1.90 | 1.90 | 1.90 | — | — | — | — |
| X2-5357 (pbw) | — | — | — | — | — | — | — | 1.90 | 1.90 | 1.90 | 1.90 |
| CAT. C (pbw) | 1.20 | 1.20 | 1.04 | 1.04 | 1.20 | 1.20 | 1.00 | 1.25 | 1.20 | 1.20 | 1.04 |
| CAT. A (pbw) | 0.65 | 0.65 | 0.52 | 0.52 | 0.65 | 0.65 | 0.54 | 0.67 | 0.65 | 0.65 | 0.52 |
| WATER (pbw) | 0.36 | 0.36 | 0.36 | 0.36 | 0.36 | 0.36 | 0.36 | 0.35 | 0.36 | 0.36 | 0.36 |
| HCFC-141b (pbw) | 29.1 | 29.1 | 29.4 | 29.4 | 29.1 | 29.1 | 29.1 | 29.3 | 29.1 | 29.1 | 29.6 |
| NCO | B | B | B | B | B | B | B | B | B | B | B |
| (pbw) | 107.5 | 107.5 | 107.9 | 107.9 | 107.5 | 107.5 | 107.5 | 107.4 | 107.5 | 107.5 | 108.8 |

TABLE 2

| EXAMPLE | 1 | 2 | 3 | 4 | 5 | 6 | 7 | 8 | 9 | 10 | 11 |
|---|---|---|---|---|---|---|---|---|---|---|---|
| Mix Time (sec) | 5 | 5 | 5 | 5 | 5 | 5 | 5 | 5 | 5 | 5 | 5 |
| Cream (sec) | 10 | 10 | 16 | 11 | 9 | 8 | 10 | 8 | 8 | 8 | 9 |
| Gel (sec) | 33 | 28 | 43 | 28 | 34 | 29 | 34 | 30 | 26+ | 27 | 31 |
| Min. Fill Density (lb/ft$^3$) | 1.94 | 1.99 | 1.95 | 1.94 | 2.01 | 1.98 | 1.99 | 1.95 | 1.94 | 1.96 | 1.86 |
| Pack Density (lb/ft$^3$) | 2.10 | 2.13 | 2.13 | 2.10 | 2.18 | 2.15 | 2.20 | 2.13 | 2.10 | 2.16 | 2.06 |
| % Packing | 8.6 | 7.0 | 9.1 | 8.2 | 8.1 | 8.8 | 10.3 | 9.4 | 8.4 | 10.2 | 10.5 |
| K-factor | .116 | .112 | .123 | .120 | .116 | .116 | .114 | .115 | .110 | .111 | .112 |
| % Thick. Increase | 2.6 | 1.0 | 4.5 | 0.5 | 2.5 | 2.5 | 4.5 | 2.5 | 1.0 | 3.0 | 1.5 |
| @% Pack | 8.6 | 7.0 | 9.1 | 8.2 | 8.1 | 8.8 | 10.3 | 9.4 | 8.4 | 10.2 | 10.5 |
| % Thick. Increase | 4.1 | 2.6 | 8.5 | 1.0 | 6.0 | 5.5 | 7.0 | 4.0 | 2.5 | 5.5 | 2.0 |
| @% Pack | 18.3 | 18.4 | 19.1 | 20.0 | 19.4 | 19.1 | 18.3 | 15.5 | 18.2 | 19.3 | 19.6 |

Examples 12–17

Foams were made from the materials listed in Table 3 in the amounts indicated using the same procedure as was used in Examples 1–11. The properties of these foams are reported in Table 4.

Examples 18–19

Foams were made by reacting the components listed in Table 5 in the amounts indicated. These foams were made using a Hennecke HK 100 foam machine. The properties of those foams are reported in Table 6.

TABLE 3

| EXAMPLE | 12 | 13 | 14 | 15 | 16 | 17 |
|---|---|---|---|---|---|---|
| POLYOL | A | H | A | L | A | L |
| AMT. (pbw) | 30.1 | 30.25 | 37.85 | 37.85 | 37.85 | 37.85 |
| POLYOL | D | D | M | M | M | M |
| AMT. (pbw) | 6.02 | 6.02 | 7.28 | 7.28 | 7.28 | 7.28 |
| POLYOL | — | — | G | G | G | G |
| AMT. (pbw) | — | — | 27.65 | 27.65 | 27.65 | 27.65 |
| SURFACT. (pbw) | 1.90 | 1.90 | — | — | — | — |
| B-8426 (pbw) | — | — | 1.52 | 1.52 | 1.52 | 1.52 |
| CAT. C (pbw) | 0.87 | 0.80 | — | — | — | — |
| CAT. A (pbw) | 0.43 | 0.40 | — | — | — | — |
| CAT. B (pbw) | — | — | 2.20 | 2.20 | 2.20 | 2.20 |
| WATER (pbw) | 1.90 | 1.90 | 1.52 | 1.52 | 1.52 | 1.52 |
| HCFC-123 (pbw) | 34.70 | 34.50 | — | — | — | — |
| HFC-356 (pbw) | — | — | 21.98 | 21.98 | 21.98 | 21.98 |
| NCO | A | A | B | B | C | C |
| AMT. (pbw) | 128.5 | 128.5 | 107.7 | 107.7 | 127.5 | 127.5 |

TABLE 4

| EXAMPLE | 12 | 13 | 14 | 15 | 16 | 17 |
|---|---|---|---|---|---|---|
| Mix time (sec) | 5 | 5 | 5 | 5 | 5 | 5 |
| Cream (sec) | 11 | 10 | 5 | 5 | 9 | 8 |
| Gel (sec) | 40 | 43 | 65 | 47 | 90 | 63 |
| Min. fill Density (lb/ft$^3$) | 1.69 | 1.59 | 2.07 | 2.11 | 2.28 | 2.32 |
| Packed Density (lb/ft$^3$) | 1.88 | 1.73 | 2.23 | 2.34 | 2.56 | 2.52 |
| % Pack | 11.4 | 9.0 | 8.0 | 10.8 | 12.2 | 8.7 |
| K-factor | 0.127 | 0.118 | 0.137 | 0.133 | 0.131 | 0.129 |
| % Thick. Increase | 2.0 | 0.5 | 1.0 | 0 | 8.2 | 2.1 |
| @% Pack | 11.4 | 9.0 | 8.0 | 10.8 | 12.2 | 8.7 |
| % Thick. Increase | 5.1 | 3.6 | — | — | — | — |
| @% Pack | 19.3 | 18.2 | — | — | — | — |

TABLE 5

| EXAMPLE | 18 | 19 |
| --- | --- | --- |
| POLYOL | A | L |
| AMT. (pbw) | 33.39 | 33.39 |
| POLYOL D (pbw) | 26.72 | 26.72 |
| POLYOL E (pbw) | 6.68 | 6.68 |
| SURFACTANT (pbw) | 1.90 | 1.90 |
| CAT. C (pbw) | 1.20 | 1.04 |
| CAT. A (pbw) | 0.65 | 0.52 |
| WATER (pbw) | 0.36 | 0.36 |
| HCFC-141b (pbw) | 29.10 | 29.39 |
| POLYNCO A (pbw) | 107.5 | 107.9 |

TABLE 6

| EXAMPLE | 18 | 19 |
| --- | --- | --- |
| Cream time (sec) | 4 | 7 |
| Gel time (sec) | 29 | 23 |
| Minimum fill density (lb/ft$^3$) | 2.05 | 2.07 |
| Freeze stable density (lb/ft$^3$) | 2.21 | 2.23 |
| % Packing Demold | 7.8 | 7.7 |
| % Thickness increase after | | |
| 2.5 min. | 7.1 | 3.7 |
| 3.0 min. | 5.5 | 2.9 |
| 4.0 min. | 2.7 | 1.0 |
| 6.0 min. | 0.5 | 0.3 |
| 8.0 min. | 0.3 | 0 |
| K-factor | | |
| Holometrix | 0.119 | 0.116 |
| Anacon | 0.121 | 0.115 |

Although the invention has been described in detail in the foregoing for the purpose of illustration, it is to be understood that such detail is solely for that purpose and that variations can be made therein by those skilled in the ad without departing from the spirit and scope of the invention except as it may be limited by the claims.

What is claimed is:

1. A process for the production of rigid polyurethane foams having improved demold properties and good K-factors comprising reacting a) an organic polyisocyanate with b) a sucrose-based, ethylene oxide, propylene oxide polyether polyol having a molecular weight of from about 400 to about 1200 which has been neutralized in the presence of c) one blowing agent selected from the group consisting of hydrogen-containing chlorofluorocarbons, hydrogen-containing fluorocarbons and hydrocarbons and d) a catalyst.

2. The process of claim 1 in which polyol b) is neutralized with a hydroxy carboxylic acid.

3. The process of claim 2 in which the blowing agent c) is a hydrogen-containing chlorofluorocarbon.

4. The process of claim 2 in which the blowing agent c) is a hydrogen-containing fluorocarbon.

5. The process of claim 2 in which the blowing agent c) is a hydrocarbon.

6. The process of claim 2 in which lactic acid is used to neutralize polyol b).

7. The process of claim 1 in which the organic polyisocyanate is selected from the group consisting of diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenylpropane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenylpolyisocyanates.

8. The process of claim 1 in which the blowing agent c) is selected from the group consisting of 1,1-dichloro-2,2,2-trifluoroethane, 1,1-dichloro-1-fluoroethane and 1,1,1,4,4,4-hexafluorobutane.

9. The process of claim 1 in which polyether polyols which are not based upon sucrose are also included in the reaction mixture.

10. The process of claim 1 in which carbon black is included in the reaction mixture.

11. The process of claim 1 in which water is included in the reaction mixture.

12. The process of claim 1 in which a surfactant is included in the reaction mixture.

13. The process of claim 1 in which the catalyst d) is a tertiary amine.

14. The process of claim 1 in which the sucrose-based polyol b) has been prepared by ethoxylating sucrose and then propoxylating the ethoxylation product.

15. The process of claim 14 in which 30% by weight of the total alkylene oxide used is ethylene oxide and the remaining 70% by weight of the total weight of alkylene oxide used is propylene oxide.

16. The foam produced by the process of claim 1.
17. The foam produced by the process of claim 2.
18. The foam produced by the process of claim 3.
19. The foam produced by the process of claim 4.
20. The foam produced by the process of claim 5.
21. The foam produced by the process of claim 6.
22. The foam produced by the process of claim 8.
23. The foam produced by the process of claim 10.
24. The foam produced by the process of claim 11.

* * * * *